United States Patent [19]
Vogel et al.

[11] Patent Number: 6,022,386
[45] Date of Patent: Feb. 8, 2000

[54] PROCESS FOR PRODUCING POROUS AMMONIUM NITRATE AND AMMONIUM NITRATES PRODUCED

[75] Inventors: Edmond Vogel, Vaucresson; Jacques Monsterleet, Marly Le Roi, both of France

[73] Assignee: Kaltenbach-Thuring S.A., Beauvais, France

[21] Appl. No.: 09/000,549

[22] Filed: Dec. 30, 1997

[51] Int. Cl.[7] .............................. C22B 1/14; C01C 1/18
[52] U.S. Cl. ...................................... 23/313 FB; 423/396
[58] Field of Search ...................... 423/396; 23/313 FB

[56] References Cited

U.S. PATENT DOCUMENTS

| | | | |
|---|---|---|---|
| 2,416,615 | 2/1947 | Datin . | |
| 2,798,301 | 7/1957 | Antle | 423/396 |
| 4,408,998 | 10/1983 | Mutsers et al. | 423/396 |
| 4,409,016 | 10/1983 | Mutsers et al. | 423/396 |
| 5,540,793 | 7/1996 | Bals et al. | 423/396 |

FOREIGN PATENT DOCUMENTS

| | | | |
|---|---|---|---|
| 649326 | 11/1992 | Australia | 423/396 |
| 0068574 | 1/1983 | European Pat. Off. . | |
| 0216653 | 4/1987 | European Pat. Off. . | |
| 0569163 | 11/1993 | European Pat. Off. . | |
| 24513651 | 10/1980 | France . | |
| 894773 | 4/1962 | United Kingdom . | |
| 990487 | 4/1965 | United Kingdom . | |

OTHER PUBLICATIONS

Chemical Abstracts, vol. 90, No. 2, Jan. 3, 1919, Columbus, Ohio, US, Abstract No. 8527, SAEZ SAIZ & AL.: "Drying of porous ammonium nitrate explosives in",rilling"plants using a fluidized bed " XP002040374 *abrege* & ES 456 079 A a Feb, 1978.

*Primary Examiner*—Wayne Langel
*Attorney, Agent, or Firm*—Dowell & Dowell, P.C.

[57] ABSTRACT

According to this process, there is used a granulator (10) employing a rotary drum and a fluid bed which is usually employed for producing dense granules for the production of porous granules, For this purpose, the process comprises spraying in this granulator ammonium nitrate in solution and effecting a combined cycle of granulation and drying which causes the formation of pores in the mass of the granules. The drying is then terminated in a drier (20) and the product thereafter is screened and cooled.

8 Claims, 1 Drawing Sheet

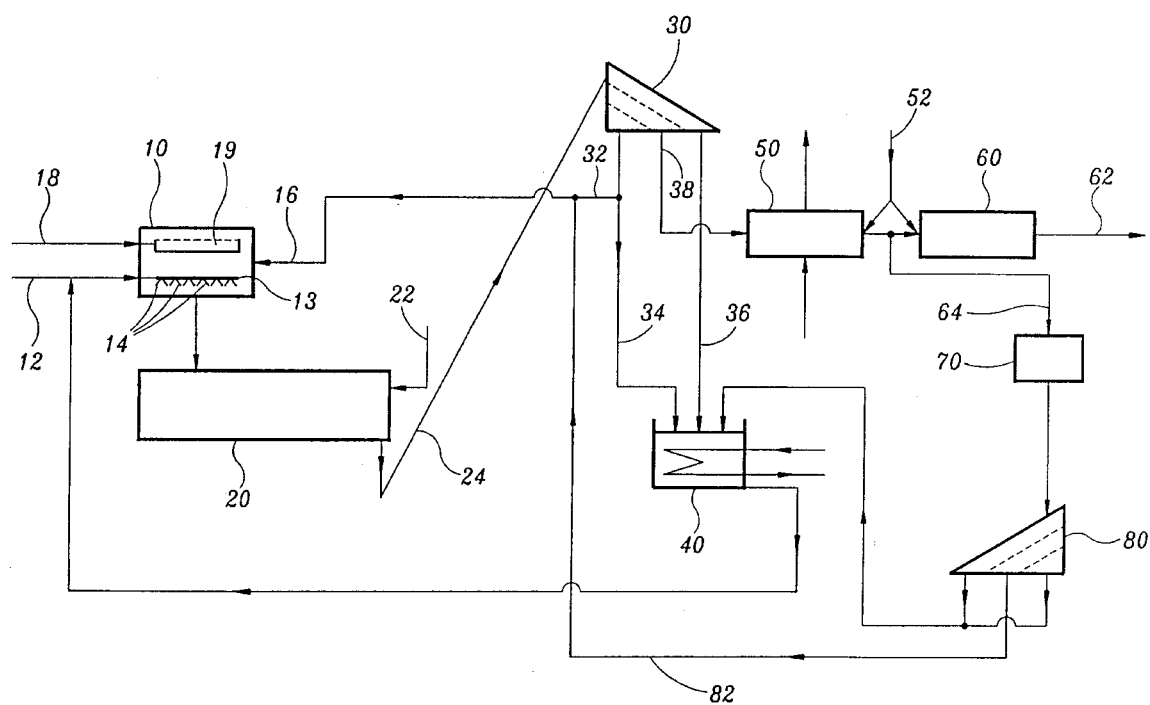

6,022,386

PROCESS FOR PRODUCING POROUS AMMONIUM NITRATE AND AMMONIUM NITRATES PRODUCED

BACKGROUND OF THE INVENTION

Field of the Invention

The present invention relates to a process and a plant for producing porous nitrate.

BRIEF DESCRIPTION OF THE RELATED ART

Ammonium nitrate is well known for its explosive qualities. The possibility of conditioning it in the form of small balls having a diameter usually between 1 and 3 mm renders it very easy to use as a civil explosive employed in quarries, mines, etc.

It is usually mixed with fuel oil in the proportions of 94% of ammonium nitrate for 6% of fuel oil. The presence of the hydrocarbon has for effect to sensitize the nitrate, i.e. to permit it to detonate more easily by the effect of sympathy with an initiating explosive. To permit the absorption of hydrocarbon by the nitrate granules, the latter are rendered porous, the usual method for producing such granules comprising spraying a solution of ammonium nitrate at the top of a granulating tower, then recovering in the lower part of the tower the crystallized granules and drying them, the desired porosity being obtained during the drying by elimination of the water contained in the granules.

Such a process is costly bearing in mind in particular the considerable investment involved in the construction of a granulating tower.

This is why it has been envisaged to produce granules by compaction of ammonium nitrate fines, but the porosity obtained is low and the compaction of the ammonium nitrate is a difficult and even dangerous operation.

It has also been envisaged to subject ammonium nitrate of agricultural quality, and therefore dense, to thermal cycles around the transition point of 32° so as to create by the successive expansions and contractions cracks resulting in a certain porosity. However, this method has been found to be of no interest since the granules obtained are fragile and the form of the pores do not permit retaining the fuel oil after its absorption.

SUMMARY OF THE INVENTION

Therefore an object of the invention is to provide a process and a plant for producing porous granules of ammonium nitrate; these granules must be of good quality with respect to the envisaged application, i.e. must have sufficient porosity and strength, this process moreover avoiding the use of a granulating tower to reduce the investment and the production costs.

The invention therefore provides a process for producing porous granules of ammonium nitrate, characterized in that it comprises introducing in a granulator employing a rotary drum and a fluid bed, primers of solid ammonium nitrate, spraying on these primers a solution of ammonium nitrate having a concentration of between 94 and 98% and a temperature of between 135 and 170° C., eliminating a part of the water contained in the solution in the course of the granulation by the combined actions of the heat of the crystallization of the nitrate and of a stream of air blown under the bed, and eliminating the remaining water in the course of a drying operation at the exit of the granulator.

The invention also provides a plant for carrying out the process defined hereinbefore.

BRIEF DESCRIPTION OF THE DRAWINGS

The invention will be described in more detail hereinafter with reference to the accompanying drawing the single FIGURE of which represents a diagram of the process according to the invention.

DESCRIPTION OF THE PREFERRED EMBODIMENT

The operation of the granulation of ammonium nitrate is carried out in a granulator 10 of the type having a rotary drum and a fluid bed, for example such as the type described in the document FR-A-85 12 082 which is usually employed for producing dense granules of ammonium nitrate from molten salts at a high concentration (99.5 to 99.9%).

In the present case, this granulator receives, on one hand at 12, a solution of ammonium nitrate sprayed by means of a manifold 13 provided with nozzles 14 and, on the other hand, nitrate in the solid state through a pipe 16. It also receives at 18 fluidizing air, optionally conditioned in accordance with the surrounding climactic conditions, fed to the fluid bed 19.

The solution of nitrate introduced in the granulator may have the following characteristics:

concentration of 94 to 98% temperature: 135 to 170° C. and preferably 140 to 160° C.

It may contain pore-producing additives among which for example surface-active agents such as alcohol sulphate salts or napthalene sulphonates of soda. These pore-producing additives may be provided in proportions of between 100 and 2000 ppm and preferably between 400 and 700 ppm.

This solution may also contain hardening additives and in particular salts such as ammonium sulphate, magnesium nitrate, alumina sulphate or other metal salts, in proportions of between for example 0.1 and 2%.

The solid products introduced in the granulator are recycled fines and primers which may be formed either by crushed coarse products, or by a crushed merchant product. The size of these primers is chosen in accordance with the size of the finished product. For example, for a finished product having a mean diameter of 3 mm, one will try to introduce primers having a mean diameter of 0.8 mm. Owing to the natural breaking up of handled products and the natural constitution of primers resulting from this breaking up, the quantity of primers to be generated in the crusher may be no more than 4% of the total capacity.

In the granulator, in the known manner, the spraying of the solution of nitrate is effected by means of the manifold 13 whose nozzles are directed toward the wall of product falling from the fluid bed 19. The manifold may be placed indifferently below or above the wall of product. The spraying pressure depends on the nature of the sprayers but must permit obtaining droplets whose size is preferably less than $300\mu$.

The rate of flow of the blown air, its temperature and the period during which the product sojourns in the granulator are so determined that the humidity of the product issuing from this granulator is between 0.5 and 1.5% and its temperature between 35 and 55° C.

The product leaving the granulator is conveyed into a drier 20 in which the water content of the product is reduced to less than 0.2% water. For this purpose, hot air 22 at a temperature of between 110 and 160° C. and preferably 120 and 140° C. is blown into this drier.

The product leaves the drier at 24 at a temperature of between 40 and 80° C. and preferably between and 50 and 60° C., this temperature being in any case lower than the transition temperature of the product which is 84.2° C. and corresponds to the passage from a tetragonal structure of the nitrate to a rhombohedral structure with a variation of the specific volume of the product.

Care is also taken in the course of these granulating and drying stages, to ensure that the product does not drop beyond another transition point, at 32° C., in respect of which a new variation of the specific volume of the nitrate occurs.

The product leaving the drier is conveyed to a screen 30 where the products outside the specification (the fine and coarse products) are separated. At least a part 32 of the fine products is recycled to the granulator in accordance with the desired recycling rate, the excess fine products 34 and the coarse products 36 being remelted in a melter 40 for remixing with the concentrated solution entering the granulator.

The granules 38 having the correct dimensions issuing from the screen 30 are introduced in a cooler 50 of any suitable type, for example having a fluid bed, and, after cooling, these granules may be coated with an anti-massing product 52 in a coater 60 before being conveyed (at 62) to a storage installation. In order to avoid dropping beyond the transition point at 32° C., the temperature at the exit of the cooler and in the storage installation may be maintained higher than 35° C. for example.

A part 64 of the merchant product may be transmitted to a crusher 70 and then a screen 80 so as to provide primers 82 at the suitable dimension which are introduced in the granulator. The fine and coarse products leaving this screen are remelted and introduced in the solution of nitrate.

The conditions under which the granulation and the drying are carried out according to the process described hereinbefore are such that the granules obtained have a satisfactory porosity and are particularly strong. This result is due in particular to the special conditions under which there is effected in the granulator the crystallization and drying cycle producing the swelling of the granules in successive layers and the elimination of the water during the formation of each of the layers. The porosity obtained in this way is even and distributed in a large part of the thickness of these granules. Further, the process limits to a single occasion, in the course of the crystallization in the granulator, the passage through the upper transition point situated at about 84.2° C., the lower transition point situated at about 32° C. being passed through no more than once during the cooling of the product. It is indeed important to pass through these transition points the lowest possible number of times since the variations of volume due to the change in the crystalline structure of the nitrate create cracks within the granule which render it fragile and result in a porosity of the crevasse type which does not permit suitably retaining the fuel oil. An example of carrying out this process may be the following:

There are introduced in the granulator a 95% solution of nitrate at a rate of flow of 6,762 kg/h at a temperature of 150° C. with 4.5 kg/h of a commercially-available surface active additive based on napthalene sulphanate, 44,579 kg/h of air at 27° C. and 6,627 kg/h of recycled granulated nitrate, at 60° C., having a water content of the order of 0.1% and containing solid particles constituting primers having a particle size of between 0.6 and 1 mm.

There are obtained at the exit of the granulator 13,044 kg/h of granulated nitrate having a water content of 1% at a temperature of 50° C. which are introduced in the drier at 120° C. at a rate of flow of 15,846 kg/h.

After drying, 12,727 kg/h of granulated nitrate at 60° C. containing about 0.1% water are obtained.

After screening, remelting of the coarse and fine products and cooling at 28° C., there are obtained 4,200 kg/h of very strong porous granulated nitrate having an apparent density of 0.67, a particle size of 1 to 2.8 mm for 98% of the product and a fuel oil-absorbing capacity of 10%.

We claim:

1. A process for producing porous granules of ammonium nitrate, comprising the steps of:

a) introducing primers of solid ammonium nitrate into a fluid bed of a granulator having a rotary drum, b) spraying on the primers within the fluid bed a solution of ammonium nitrate having a concentration of ammonium nitrate between 94 and 98% and a temperature of between 135 and 170° C. so as to form a plurality of layers of the solution on the primers and reducing a water content of the solution forming each layer by combined action of heat of crystallization of the nitrate and by passing an air stream through the fluid bed to thereby form pores in each layer and obtaining a porous granular product of ammonium nitrate having a water content of between 0.5 to 1.5% and a temperature of between 35 to 55° C.;

c) conveying the porous granular product from the granulator into a dryer and drying the granular product so as to further reduce the water content of the granular product;

d) thereafter cooling the porous granular product issuing from the dryer; and e) wherein during the steps of granulating, drying and cooling, upper and lower transition temperatures of the ammonium nitrate of approximately 84° C. and 32° C., respectively, are passed through only once.

2. The process of claim 1 wherein said solution of ammonium nitrate is introduced into the granulator at a temperature of between 140 and 160° C.

3. The process of claim 1 wherein the porous granular product within the dryer is dried to reduce the water content to less than 0.2%, and issuing the dried porous granular product from the dryer at a temperature of between 40 and 80° C.

4. The process of claim 3 wherein the step of drying includes introducing hot air at a temperature of between 110 to 160° C. into the dryer.

5. The process of claim 1, including adding pore producing additives in amounts of between 100 and 2000 ppm to the solution of ammonium nitrate before the solution is into the granulator.

6. The process of claim 5 wherein the pore producing additives are selected from a group of additives consisting of alcohol sulphate salts and naphthalene sulphonates of soda.

7. The process of claim 1, including adding hardening additives in proportions of 0.1 to 2.0% to the solution of ammonium nitrate before the solution is sprayed into the granulator.

8. The process of claim 7 wherein the hardening additives are selected from a group of additives consisting of ammonium sulphate, magnesium nitrate and alumina sulphate.

* * * * *

UNITED STATES PATENT AND TRADEMARK OFFICE
CERTIFICATE OF CORRECTION

PATENT NO.    : 6,022,386
DATED         : February 8, 2000
INVENTOR(S)   : Edmond Vogel and Jacques Monsterleet It is certified that error appears in the above-identified patent and that said Letters Patent is hereby corrected as shown below:

<u>Title page,</u>
Insert:
-- [30]  Foreign Application Priority Data
December 31, 1996     [FR]    France.....................96/16297 --

Signed and Sealed this

Twenty-eighth Day of January, 2003

JAMES E. ROGAN
*Director of the United States Patent and Trademark Office*